US010629366B2

(12) United States Patent
Lee et al.

(10) Patent No.: US 10,629,366 B2
(45) Date of Patent: Apr. 21, 2020

(54) MAGNETIC SHIELDING UNIT FOR WIRELESS POWER TRANSMISSION IN MAGNETIC RESONANCE MODE, AND WIRELESS POWER TRANSMISSION MODULE AND ELECTRONIC DEVICE COMPRISING SAME

(71) Applicant: Amosense Co., Ltd., Cheonan-si (KR)

(72) Inventors: Dong Hoon Lee, Yongin-si (KR); Sung Hyun Park, Suwon-si (KR)

(73) Assignee: Amosense Co., Ltd., Cheonan-si (KR)

( * ) Notice: Subject to any disclaimer, the term of this patent is extended or adjusted under 35 U.S.C. 154(b) by 6 days.

(21) Appl. No.: 15/757,129

(22) PCT Filed: Sep. 5, 2016

(86) PCT No.: PCT/KR2016/009919
§ 371 (c)(1),
(2) Date: Mar. 2, 2018

(87) PCT Pub. No.: WO2017/039420
PCT Pub. Date: Mar. 9, 2017

(65) Prior Publication Data
US 2018/0254140 A1    Sep. 6, 2018

(30) Foreign Application Priority Data

Sep. 4, 2015 (KR) .................. 10-2015-0125829

(51) Int. Cl.
*H02J 50/12* (2016.01)
*H01F 27/36* (2006.01)
(Continued)

(52) U.S. Cl.
CPC ........... *H01F 27/365* (2013.01); *B32B 15/04* (2013.01); *C22C 33/003* (2013.01); *C22C 38/02* (2013.01);
(Continued)

(58) Field of Classification Search
CPC .... H01F 27/365; H01F 38/14; H01F 1/15308; H01F 27/2885; H01F 2027/348; H02J 50/12; H02J 50/70
See application file for complete search history.

(56) References Cited

U.S. PATENT DOCUMENTS 9,269,490 B2    2/2016  Jung et al.
2011/0234155 A1  9/2011  Chen et al.
(Continued)

FOREIGN PATENT DOCUMENTS

JP    2015-505166 A    2/2015
KR    10-0971701 B1    7/2010
(Continued)

OTHER PUBLICATIONS

PCT International Search Report dated Dec. 29, 2016 for International Application No. PCT/KR2016/009919; 3 Pages.

*Primary Examiner* — Daniel Kessie
(74) *Attorney, Agent, or Firm* — Daly, Crowley Mofford & Durkee, LLP

(57) ABSTRACT

A wireless power transmission module operable in magnetic resonance method including a radiator unit for wireless power transmission, and a magnetic field shielding unit, disposed on a side of the radiator unit, for preventing disturbance of transmission and reception of the radiator due to the conductor and improving radiator characteristics, by providing a magnetic field shielding layer which includes shredded Fe-based alloy fragments and a dielectric filling at least a part of gaps between shredded Fe-based alloy fragments and some adjacent ones of the fragments to reduce eddy currents, to improve flexibility of and reduce eddy currents in the magnetic field shielding unit. When a wireless power signal is transmitted and received in a magnetic resonance method, the influence of a magnetic field on components of s a mobile terminal or a user can be blocked.

(Continued)

Interference with the transmission/reception of the power signal due to the conductor can be minimized or prevented. The radiator characteristics and wireless power transmission efficiency can be remarkably improved.

13 Claims, 7 Drawing Sheets

(51) Int. Cl.

| | | |
|---|---|---|
| C22C 45/02 | (2006.01) | |
| B32B 15/04 | (2006.01) | |
| C22C 33/00 | (2006.01) | |
| H01F 27/00 | (2006.01) | |
| C22C 38/02 | (2006.01) | |
| C22C 38/12 | (2006.01) | |
| H01F 27/28 | (2006.01) | |
| C22C 38/16 | (2006.01) | |
| H02J 50/70 | (2016.01) | |
| H01F 1/153 | (2006.01) | |
| H01F 38/14 | (2006.01) | |
| H01F 27/34 | (2006.01) | |
| H02J 7/02 | (2016.01) | |

(52) U.S. Cl.
CPC .............. *C22C 38/12* (2013.01); *C22C 38/16* (2013.01); *C22C 45/02* (2013.01); *H01F 1/15308* (2013.01); *H01F 27/006* (2013.01); *H01F 27/2823* (2013.01); *H01F 27/2885* (2013.01); *H01F 38/14* (2013.01); *H02J 50/12* (2016.02); *H02J 50/70* (2016.02); *H01F 2027/348* (2013.01); *H02J 7/025* (2013.01)

(56) References Cited

U.S. PATENT DOCUMENTS

2016/0064814 A1    3/2016  Jang et al.
2016/0081240 A1*   3/2016  Lee ..................... H01F 38/14
                                                    307/91

FOREIGN PATENT DOCUMENTS

| KR | 10-1299549 B1 | 8/2013 |
| KR | 10-1368771 B1 | 3/2014 |
| KR | 10-2014-0109336 A | 9/2014 |
| WO | WO 2006/059771 A1 | 6/2006 |
| WO | WO 2012/147341 A1 | 11/2012 |
| WO | WO 2014/062577 A3 | 4/2014 |

* cited by examiner

MAGNETIC SHIELDING UNIT FOR WIRELESS POWER TRANSMISSION IN MAGNETIC RESONANCE MODE, AND WIRELESS POWER TRANSMISSION MODULE AND ELECTRONIC DEVICE COMPRISING SAME

CROSS-REFERENCE TO RELATED APPLICATION

This application is a U.S. National Stage of PCT/KR2016/009919 filed in the Korean language on Sep. 5, 2016, entitled: "Magnetic Shielding Unit For Wireless Power Transmission In Magnetic Resonance Mode, And Wireless Power Transmission Module And Electronic Device Comprising Same" which application claims priority to Korean Application No. 10-2015-0125829 filed on Sep. 4, 2015, which applications are each hereby incorporated herein by reference in their entireties.

BACKGROUND

1. Technical Field

The present disclosure relates to a wireless power transmission module. In particular, the present disclosure relates to a wireless power transmission module operable in a magnetic resonance method, a magnetic field shielding unit for a magnetic resonance based wireless power transmission and a portable device including the same, which can block an influence of a magnetic field on components of a portable terminal or its user when a wireless power signal is transmitted and received in the magnetic resonance method, minimize or prevent disturbance to transmission and reception of power signals due to neighboring conductors, and significantly increase efficiency of the magnetic resonance based wireless power transmission by improving characteristics of a radiator.

2. Discussion of the Related Art

Wireless charging technology of portable electronic devices such as mobile phones, personal digital assistants (PDAs), iPads, notebook computers, and tablet PCs is newly emerging. The new wireless charging (WLC) technology enables a portable electronic device to charge a battery by directly transferring power to a portable electronic device without using a power line. Recently, portable electronic devices adopting this technology are increasing. The wireless charging may be classified into a magnetic induction method, and a magnetic resonance method, or classified into a power matters alliance (PMA) standard method and a Qi standard method depending on a method of detecting the wireless power reception module coming close to the wireless power transmission module.

The magnetic induction method and the magnetic resonance method use the magnetic field and are the same technologies in that these generate an electromagnetic field by using coils and transfer the electric power through the electromagnetic field. However, the magnetic induction method is different from the magnetic resonance method in that the magnetic induction method uses an electromagnetic induction phenomenon between coils whereas the magnetic resonance method uses a magnetic resonance phenomenon between the coils. Further, the operating frequencies of the two methods are different from each other. The magnetic induction method is based on a principle in which the magnetic field generated from a primary coil induces a current in a secondary coil to supply energy when the coils are overlapped with each other. The magnetic resonance method is based on a principle that when a magnetic field having a resonant frequency is generated from the wireless power transmission module, the magnetic field is received by a receiving radiator of a wireless power receiving module designed to resonate at the same frequency as the resonance frequency to generate current and supply energy. It is characterized in that the power can be transmitted without direct contact with a charging mat. The magnetic resonance method is basically similar to the magnetic induction method in that the current is converted into the magnetic field through the coil, but different from the magnetic induction method in that the power is transmitted via the converted magnetic field of the resonance frequency over a long distance. In addition, the magnetic resonance method needs a configuration of the wireless power transmission module and the wireless power reception module which include capacitors and coils, so that resonance occurs in a predetermined frequency band and wireless power transmission is performed.

Here, the magnetic resonance method, when the conductors such as the battery, various electronic parts, metal case, and the like are disposed around the radiator of the wireless power transmission module and/or the wireless power reception module, transmitting and receiving a magnetic field having a predetermined operating frequency may be hindered, and as a result, the wireless power transmission operating in magnetic resonance may be blocked or the transmission/reception distance of the wireless power signal may be significantly shortened.

Accordingly, it is required to develop a wireless power transmission module capable of increasing the wireless power transmission distance based on the magnetic resonance method and improving the efficiency even when the conductors are disposed adjacent to the wireless power transmission module.

SUMMARY

To solve the above problem and defects, it is an object of the present disclosure to provide a wireless power transmission module operable in the magnetic resonance method and the magnetic field shielding unit for wireless power transmission usable for implementing the wireless power transmission module, where the wireless power transmission module can prevent disturbance to transmission and reception of power signals due to neighboring conductors, increase efficiency of the magnetic resonance based wireless power transmission by significantly improving characteristics of a radiator block, and minimize or shield the influence of a magnetic field on the components of a portable terminal or a its user when a wireless power signal is transmitted in the magnetic resonance method.

It is another object of the present disclosure to provide a wireless power transmission module and a magnetic field shielding unit for wireless power transmission usable for implementing the same with excellent transmission efficiency and extended transmission distance, capable of transmitting a wireless power signal through the magnetic resonance even at a low frequency of less than 1 MHz.

It is further another object of the present disclosure to provide a slim wireless power transmission module capable of realizing excellent wireless power transmission efficiency and transmission distance with a thinned magnetic field shielding unit.

Furthermore, it is still another object of the present disclosure to provide the wireless power transmission module capable of minimizing a change in the designed initial physical properties due to damage by an external force applied even though it is the thinned magnetic field shielding unit, thereby maintaining a desired transmission efficiency and transmission distance consistently.

In addition, it is still another object of the present disclosure to provide an electronic device capable of being charged or operated wirelessly through the wireless power transmission module according to the present disclosure, even when the electronic device is far away from the transmitting device of the wireless power and disposed near conductors.

According to an aspect of the present disclosure, there is provided a wireless power transmission module operable in the magnetic resonance method including a radiator for wireless power transmission disposed adjacent to a conductor. The wireless power transmission module operable in magnetic resonance method includes a radiator unit and a magnetic field shielding unit. The radiator unit includes the radiator for wireless power transmission. The magnetic field shielding unit is disposed on one surface of the radiator unit, and prevents disturbance of transmission and reception of the radiator due to the conductor and improves radiator characteristics, by providing a magnetic field shielding layer which includes shredded Fe-based alloy fragments and a dielectric filling at least a part of gaps between shredded Fe-based alloy fragments and some adjacent ones of the fragments to reduce eddy currents, to improve flexibility of and reduce eddy currents in the magnetic field shielding unit.

In an embodiment of the present disclosure, the magnetic field shielding unit may further include a protective member disposed on one surface of the magnetic field shielding layer and an adhesive member disposed on the other surface of the magnetic field shielding layer.

The protective member may be adhered to one surface of the magnetic field shielding layer through a first adhesive layer provided on one surface of the protective member. The adhesive member may be adhered to the other surface of the magnetic field shielding layer through a second adhesive layer provided on one surface of the adhesive member. The dielectric included in the magnetic field shielding layer may be formed such that a part of at least one of the first adhesive layer and the second adhesive layer permeates into the gaps between adjacent the Fe-based alloy fragments.

In an embodiment of the present disclosure, the dielectric may be filled in all of the gaps between adjacent Fe-based alloy fragments.

In an embodiment of the present disclosure, the Fe-based alloy fragments may be derived from a Fe-based amorphous alloy ribbon. The Fe-based alloy may be a 3-element-based alloy including iron (Fe), silicon (Si) and boron (B) or a 5-element-based alloy including iron (Fe), silicon (Si), boron (B), copper (Cu), and niobium (Nb).

In an embodiment of the present disclosure, the number of Fe-based alloy fragments of which diameters are less than 500 μm may account for 40% or more of a total number of the Fe-based alloy fragments. The number of Fe-based alloy fragments of which diameter are less than 50 μm may account for 50% or less of the total number of the Fe-based alloy fragments.

In an embodiment of the present disclosure, the Fe-based alloy fragments may have irregular shapes.

In an embodiment of the present disclosure, the magnetic field shielding unit may include a plurality of the magnetic field shield layers, and a dielectric layer interposed between adjacent magnetic field shielding layers to adhere the adjacent magnetic field shielding layers to each other and reduce eddy currents.

In an embodiment of the present disclosure, the dielectric layer may be an insulating adhesive layer or a heat-radiating adhesive layer.

In an embodiment of the present disclosure, any one of the magnetic field shielding layers may have a different permeability from the other.

In an embodiment of the present disclosure, a single layer of the magnetic field shielding layers may have a thickness of 15 to 35 μm.

In an embodiment of the present disclosure, a copper plate having a thickness of 30 μm may be disposed as the conductor on one surface of the wireless power transmission module on a surface of the magnetic field shielding unit and a bifilar coil including two first radiators may be disposed at predetermined distance from one surface of the wireless power transmission module on a side of the radiator unit, and wherein when a wireless power signal is transmitted by applying an input voltage of 6 V of a driving frequency of 750 kHz to the bifilar coil, a maximum receiving distance at which the wireless power transmission module having the second radiator as the radiator for wireless power transmission can receive the wireless power signal may be 58 mm or more.

In an embodiment of the present disclosure, the first radiator and the second radiator formed by winding a strand of copper having a diameter of 500 μm 5 turns may have an outer diameter of 50.5 mm×50.5 mm, an inner diameter of 50 mm×50 mm, a circular shape, and may have an inductance (Ls) of 3.1 to 3.15 μH and a specific resistance (Rs) of 350 to 400 mΩ when measuring with an LCR meter under a condition of 750 kHz/1 V.

In an embodiment of the present disclosure, the present disclosure is provided a magnetic field shielding unit for wireless power transmission operable in magnetic resonance, including a magnetic field shielding layer including Fe-based alloy fragments shredded for improving flexibility and reducing eddy currents; and a dielectric, filled in at least a portion of gaps formed between some adjacent Fe-based alloy fragments, for reducing an eddy current, wherein the magnetic field shielding layer prevents interference with the transmission and reception of radiators due to a conductor surrounding the radiators and improves characteristics of the radiators.

In an embodiment of the present disclosure, a second radiator may be disposed on one surface of the magnetic field shielding unit, a copper plate having a thickness of 30 μm may be disposed on the other surface of the magnetic field shielding unit, and a bifilar coil including two first radiators may be disposed at predetermined distance from the second radiator in parallel, and wherein when a wireless power signal is transmitted by applying an input voltage of 6 V of a driving frequency of 750 kHz to the bifilar coil, a maximum receiving distance at which the second radiator can receive the wireless power signal may be 58 mm or more.

In an embodiment of the present disclosure, the first radiator and the second radiator formed by winding a strand of copper having a diameter of 500 μm 5 turns may have an outer diameter of 50.5 mm×50.5 mm, an inner diameter of 50 mm×50 mm, a circular shape, and have an inductance (Ls) of 3.1 to 3.15 pH and a specific resistance (Rs) of 350 to 400 mΩ when measuring with an LCR meter under a condition of 750 kHz/1 V.

In an embodiment of the present disclosure, the number of the Fe-based alloy fragments of which diameters are less than 500 μm may account for 60% or more of the total number of the Fe-based alloy fragments. Further, the number of the Fe-based alloy fragments of which diameters are less than 100 μm may account for 50% or less of the total number of the Fe-based alloy fragments.

According to an aspect of the present disclosure, there is provided an electronic device that includes a conductor; a radiator unit including a radiator for a wireless power transmission and disposed adjacent to the conductor; and a magnetic field shielding unit, disposed on a surface of the radiator unit, comprising a magnetic field shielding layer including Fe-based alloy fragments shredded for improving flexibility and reducing eddy currents; and a dielectric, filled in at least a portion of gaps formed between some adjacent Fe-based alloy fragments, for reducing an eddy current, wherein the magnetic field shielding layer prevents interference with the transmission and reception of radiators due to a conductor and improves characteristics of the radiators.

According to the present disclosure, there is provided a wireless power transmission module operable in magnetic resonance including a magnetic field shielding unit; and a radiator unit including a radiator for the wireless power transmission wound on the outer surface of the magnetic field shielding unit.

Hereinafter, terms used in the present disclosure will be defined.

As used herein, the term "radiator" means any object that transmits and receives a signal.

According to the present disclosure, the magnetic field shielding unit for the wireless power transmission can significantly improve the wireless power transmission efficiency and the wireless power transmission distance in the magnetic resonance method by preventing the disturbance of the transmission and reception of the power signal due to the conductor, improving the radiator properties, and by minimizing the generation of the eddy current. In addition, the magnetic field shielding unit can prevent heat generation due to the eddy current, and deterioration of function and/or durability of electronic parts due to the electromagnetic interference of various signal processing circuits, and minimize adverse effects on the user's health due to the magnetic field leakage.

In addition, it is possible to realize a thinned magnetic field shielding unit which can ensure a good efficiency and transmission range of the wireless power transmission. Thus, the thinned magnetic field shielding unit is easily applicable to very slim types of wireless power transmission modules and electronic devices.

Furthermore, even though the magnetic field shielding unit is a thin type, it is possible to minimize changes in the initial-designed physical properties due to damage by an external force applied thereto, thereby maintaining the desired transmission efficiency and transmission distance.

In addition, even when the operating frequency for magnetic resonance is set to a low frequency band, the magnetic field shielding unit can give the good efficiency and transmission distance, and thus it can be widely used for the wireless power transmission module for a vehicle or a medical instrument that uses a low frequency band as an operating frequency of the magnetic resonance. The magnetic field shielding unit may be applied to various electronic devices such as various mobile devices, smart home appliances, or internet of things devices in a form of being employed by the wireless power transmission module.

BRIEF DESCRIPTION OF THE DRAWINGS

FIG. 1 is a view showing a case where dielectric is filled in a part of the gaps in a magnetic field shielding layer, and FIG. 2 is a view showing a case where dielectric is filled in all of the gaps.

FIG. 3 is a view showing a manufacturing process using a shredding device for shredding a raw shielding sheet by unevenness provided in rollers, and FIG. 4 is a view showing a manufacturing process using a shredding device for shredding the raw shielding sheet by metal balls provided on a support plate.

DETAILED DESCRIPTION OF THE EMBODIMENTS

Figure 1:
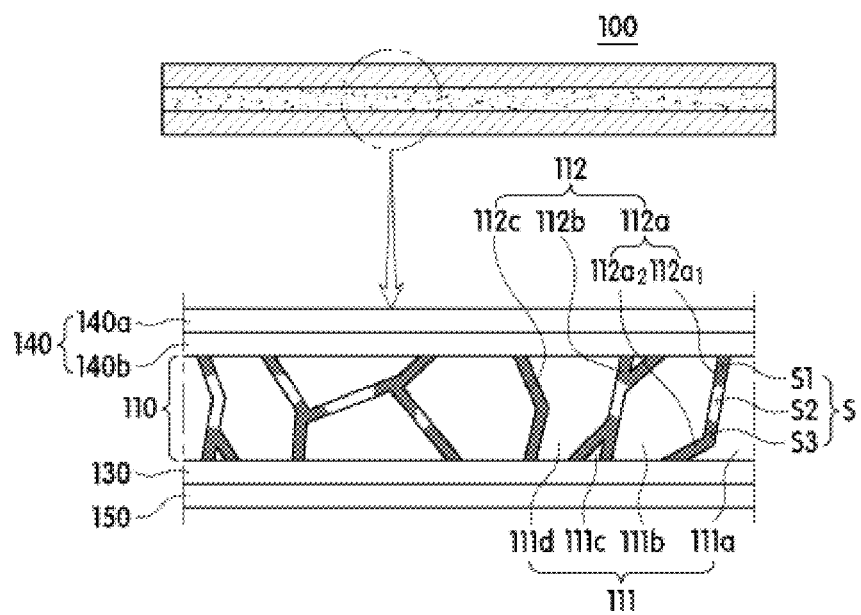
FIGS. 1 and 2 are cross-sectional views showing a magnetic field shielding unit for wireless power transmission according to an embodiment of the present disclosure.

Hereinafter, exemplary embodiments of the present disclosure will be described in detail with reference to the accompanying drawings, which will be readily apparent to those skilled in the art to which the present disclosure pertains. The present disclosure may be embodied in many different forms and is not limited to the embodiments described herein. In the drawings, parts not relating to the description are omitted for clarifying the present disclosure, and the same reference numerals are assigned to the same or similar components throughout the specification.

As shown in FIG. 1, the magnetic field shielding unit 100 for a wireless power transmission operable in the magnetic resonance method according to an embodiment of the present disclosure may include a magnetic field shielding layer 110. The magnetic field shielding layer 110 may include Fe-based alloy fragments 111 and dielectrics 112 which are filled in at least partial spaces S1 and/or S3 of all the gaps S between some adjacent ones of the Fe-based alloy fragments 111. The magnetic field shielding unit 100 may further include a protective member 140 adhered to the top surface of the magnetic field shielding layer 110 through a first adhesive layer 140b and an adhesive member 130 adhered to the bottom surface of the magnetic field shielding layer 110. The adhesive member 130 may include a second adhesive layer 130b for adhering to the bottom surface of the magnetic field shielding layer 110 and a releasing film 150 for protecting the second adhesive layer 130b.

The magnetic field shielding layer 110 may be formed of fragments 111 of a shredded Fe-based amorphous alloy in order to improve the flexibility of the shielding unit and reduce eddy currents. As shown in FIG. 1, the magnetic field shielding layer 110 is formed of shredded Fe-based alloy fragments 111a, 111b, 111c, and 111d which may provide a significantly increased specific resistance of the magnetic field shielding layer 110 compared with a case that the magnetic field shielding layer 110 is formed in a single uniform shape, for example, the ribbon sheet, and thus can suppress occurrence of the eddy currents. The specific resistance value may vary depending on the type of the magnetic material, and the magnetic material having a significantly larger specific resistance such as ferrite may be less susceptible to magnetic loss due to eddy currents. On the other hand, the Fe-based alloy, which is a magnetic material according to the embodiment of the present disclosure, may have a small specific resistance and a large magnetic loss due to the eddy current. Thus, if the magnetic field shielding layer 110 is made in a form of ribbon sheet, it may be difficult to obtain a desired level of physical properties. However, the shredded Fe-based alloy fragments obtained by shredding the ribbon sheet may have a significantly increased specific resistance due to the gaps between the shredded fragments and the decreased magnetic loss due to the eddy current. Thus, the reduction of the permeability due to fragmentation and the reduction of the inductance of the radiator due to the reduction of the permeability may be compensated.

Meanwhile, the magnetic field shielding layer 110 formed of the shredded fragments 111 may have good flexibility. The Fe-based alloy, for example, the Fe-based alloy ribbon sheet may have a remarkably small elastic modulus and be strong in brittleness, and be easily fragmented or bent when an impact is applied to the ribbon sheet. Even when the ribbon sheet of the Fe-based alloy is manufactured so as to satisfy the initial design property (for example, Permeability), there may be a problem of physical property change such that the physical property is significantly reduced compared with the initial physical property when the ribbon sheet is fragmented into multiple fine pieces. Therefore, if the magnetic field shielding layer which is not satisfying the initial design property is manufactured as a magnetic field shielding unit and is combined with a radiator, the desired wireless power transmission efficiency and transmission distance targeted at the initial designing may not be ensured. In particular, recent electronic devices such as smart phones are designed to be lightweight and slim, so that the magnetic shielding unit is also required to be thin. However, this problem becomes even more serious as the ribbon sheet of a thin thickness may be more easily broken.

However, the magnetic field shielding unit included in one embodiment of the present disclosure may be remarkably improved in flexibility. The reason is that the Fe-based alloy ribbon sheet is provided in a shredded and fragmented state at the beginning. Even if the thickness of the magnetic field shielding unit is thinned, the risk that cracks may be further generated in the Fe-based alloy fragments due to the external force can be blocked at its source. In addition, the Fe-based alloy may be provided in the magnetic field shielding unit in the fragmented state, and the initial physical property may be designed such that the magnetic field shielding unit including the ferrite in the fragmented state may exhibit excellent characteristics in the wireless power transmission of the magnetic resonance method from the beginning. Since the initial physical property value may be continuously maintained in the manufacturing step of the finished product to which the magnetic field shielding unit is installed and in the using stage of the finished product, it is possible to fundamentally eliminate deterioration of the physical property and significant reduction in the performance of power signal transmission and reception due to the deterioration due to unintentional fragmentation occurring in the magnetic field shielding unit having the ordinary non-shredded Fe-based alloy.

The Fe-based alloy may be a 3-element based alloy including iron (Fe), silicon (Si) and boron (B), or a 5-element based alloy including iron (Fe), silicon (Si), boron (B), copper (Cu), and niobium (Nb).

The 3-element based alloy may include silicon (Si) and boron (B) in addition to iron (Fe). Any other element such as chromium (Cr), cobalt (Co), or nickel (Ni) may be further added to the basic composition of the 3-element based alloy, to improve other characteristics, for example, the characteristic of corrosion resistance. When the Fe-based alloy is a Fe—Si—B-based alloy, it may be an alloy containing 70 to 90 at % of Fe. When the content of Fe is increased, the saturation magnetic flux density of the alloy may be increased, while a crystalline alloy may be produced. Further, the Si and B elements have a function of raising the crystallization temperature of the alloy and make the alloy more amorphous. For the content of the Si and B elements, Si may be 10 to 27 at % and B may be 3 to 12 at %, but the present disclosure is not limited thereto and may be changed depending on the degree of the desired properties.

The 5-element based alloy may include iron (Fe), copper (Cu), niobium (Nb) silicon (Si) and boron (B). The copper may improve the corrosion resistance of the Fe-based alloy, prevent the size of the crystal from becoming larger even when crystals are generated, and improve magnetic properties such as magnetic permeability.

The copper is preferably contained in an amount of 0.01 to 10 at % in the alloy. If copper content is less than 0.01 at %, the effect obtained by copper may be insignificant. If the copper content exceeds 10 at %, an amorphous alloy may not be produced.

In addition, the niobium (Nb) may improve magnetic properties such as magnetic permeability. It is preferable that Nb is contained in the alloy in an amount of 0.01 to 10 at %. If the amount of Nb is less than 0.01 at %, the effect obtained by niobium may be insignificant. If the amount of Nb exceeds 10 at %, it may be difficult to produce an amorphous alloy.

When the Fe-based alloy is a five-element alloy by further including Si and B, Si and B may be contained in the alloy in an amount of 10 to 30 at % and Fe may be contained as the balance. When the content of Fe is increased, the saturation magnetic flux density of the alloy may be increased, but on the contrary, a crystalline alloy may be produced. Further, the content of Si and B may increase the crystallization temperature of the alloy and make the alloy more amorphous. For the content of Si and B, Si may be 10 to 27 at % and B may be 3 to 12 at %, but it is not limited thereto and may be changed depending on the desired properties.

The Fe-based alloy fragments may originate from a Fe-based amorphous alloy ribbon, and may be heat-treated to control the desired permeability. The heat-treated Fe-based alloy may include an amorphous crystalline shape or nanocrystal grains. The crystalline shape of the Fe-based alloy may vary depending on the composition of the alloy, the composition ratio, and/or the heat treatment temperature/time.

On the other hand, with respect to the magnetic permeability of the Fe-based alloy, the magnetic material included in the conventional magnetic shielding material is advantageous for shielding the magnetic field as the magnetic permeability is higher. The relationship between the permeability of the magnetic material and the characteristics of the radiator may not be regarded as a simple proportional relationship. Accordingly, even if the permeability is too high, it may not be possible to achieve the desired level of radiator characteristics for wireless power transmission. More specifically, when any one magnetic material having a high magnetic permeability is combined with the radiator for wireless power transmission, the magnetic material may improve the inductance characteristics of the radiator or can make the increase of the specific resistance characteristics of the radiator larger than the increase of inductance characteristic. In this case, the characteristics of the radiator may be lowered or the degree of improvement of the radiator characteristics may be small compared to when the magnetic field shielding unit having a low magnetic permeability is combined with the radiator for wireless power transmission. Accordingly, it is preferable that the magnetic field shielding layer may be provided with an Fe-based alloy having an appropriate permeability so as to improve the inductance of the radiator and to minimize the increase of the specific resistance when the magnetic-field shielding unit is combined with the radiator. The permeability of the magnetic shielding layer after shredding may be 100 to 1300, more preferably 100 to 700.

However, since the temperature and the heat treatment time may be different depending on the specific composition ratio of the Fe-based alloy and the desired permeability. Therefore, the temperature and time in the heat treatment process for the Fe-based alloy ribbon may not be particularly limited thereto.

Further, the Fe-based alloy fragments may have an irregular shape as a single fragment. Further, when one corner of the Fe-based alloy fragments is curved, or one side is curved, the magnetic field shielding layer including the fragments having such a shape may increase flexibility. There is an advantage that additional fine fragmentation may be prevented even when an external force is applied to the magnetic field shielding unit.

The particle diameter of the Fe-alloy fragments may be 1 μm to 5 μm, preferably 1 μm to 1000 μm. The particle diameter of the Fe-alloy fragments may refer to the particle diameter measured through an optical microscope, which means the longest distance from one point to the other point on the surface of the fragment. Here, in the particle diameter distribution of the Fe-based alloy fragments, the number of fragments having a particle diameter of less than 500 μm may be 40% or more, more preferably 60% or more, and even more preferably 80% or more of the total number of fragments. If the number of fragments having a particle diameter of less than 500 μm is less than 40% of the total number of fragments, the Fe-based alloy has a high permeability, and even if it induces the improvement of the inductance characteristic of the radiator, the specific resistance property of the radiator may be further increased. The degree of improvement of the radiator characteristics may be very small, and a heat generation problem due to the eddy current may occur, or a performance of the magnetic field shielding unit may be deteriorated due to a magnetic leakage. Particularly, additional fine fragmentation of the Fe-based alloy due to an external force may be caused, which may lead to a changing or a decreasing in designed physical properties.

More preferably, among the Fe-based alloy fragments 111 included in the magnetic field shielding layer 110, the portion of the Fe-based alloy fragments 111 of which the particle diameter is less than 50 μm is less than 50% of the total number of the Fe-based alloy fragments 111. When the fine fragments having a particle diameter of less than 50 μm are contained in an amount of 50% or more, there is an advantage in improving the flexibility of the magnetic field shielding unit and in reducing the eddy current. However, the magnetic characteristics of the magnetic field shielding unit itself may be deteriorated and the radiator characteristics may be deteriorated accordingly.

Next, a description will be given with respect to the dielectric 112 which is filled in at least a part of gaps between the adjacent fragments 111a/111b and 111b/111d among the above-mentioned Fe-based alloy fragments 111.

The dielectric 112 may further minimize eddy currents generated by partially or totally insulating adjacent Fe-based alloy fragments, and prevent the fractured Fe-based alloy fragments 111 from moving within the magnetic field shielding layer 110. In addition, the dielectric 112 may function to prevent the amorphous alloy from being oxidized by moisture penetration. The dielectric 112 may further function as a shock absorber to prevent fragments from being additionally broken or fragmented 111 when an external force is applied to the magnetic field shielding layer.

As shown in FIG. 1, the dielectrics 112a1 and 112a2 may be filled in the partial spaces S1 and S3 of gaps S1, S2 and S3 between the first Fe-based alloy fragment 111a and the second Fe-based alloy fragment 111b. A partial space S2 of the gaps may remain in an empty space without being filled with the dielectric 112, thereby partially insulating the Fe-based alloy fragment.

Figure 2:
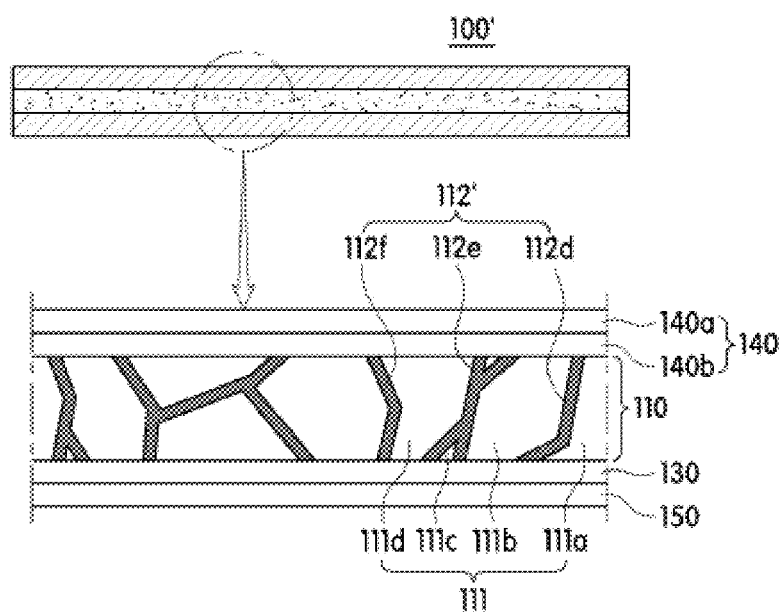

On the other hand, as shown in FIG. 2, the dielectric 112' may be filled in all of the gaps between adjacent fragments 111a to 111d to insulate all of the Fe-based alloy fragments.

The material of the dielectric 112 and 112' may be a material that is commonly known as a dielectric, and a material having adhesiveness in terms of fixing the Fe-based alloy fragments. The material having such physical property can be used without limitation. As a non-limiting example, the dielectric 112 and 112' may be a composition that is formed by hardening the dielectric forming composition, by cooling after melting by heat, or by exhibiting an adhesive force at room temperature under pressure. As an example of a composition that is hardened to form a dielectric, the dielectric forming composition may include at least one of a thermoplastic resin and a thermosetting resin, and may include a hardening agent. In addition, the dielectric forming composition may further include a hardening accelerator and a solvent.

Specifically, the thermoplastic resin may be at least one selected from the group consisting of polyethylene, polypropylene, polystyrene, polyvinyl chloride, acrylonitrile-butadiene-styrene resin (ABS), acrylonitrile-styrene resin (AN), acrylic resin, methacrylic resin, polyamide, polyethylene terephthalate (PET), polybutylene terephthalate (PBT), phenoxy resin, polyurethane resin, nitrile butadiene resin, and the like.

The thermosetting resin may include at least one of a phenol resin (PE), a urea resin (UF), a melamine resin (MF), an unsaturated polyester resin (UP) and an epoxy resin and the like, preferably, may be an epoxy resin. Examples of the epoxy resin may include multifunctional epoxy resin such as bisphenol A type, bisphenol F type, bisphenol S type, canceled bisphenol A type, hydrogenated bisphenol A type, bisphenol AF type, biphenyl type, naphthalene type, fluorene type, phenol novolak type, novolak type, trishydroxylphenylmethane type, tetraphenylmethane type and the like which may be used alone or in combination.

When the thermosetting resin is used in combination with a thermoplastic resin, the content of the thermosetting resin may be 5 to 95 parts by weight per 100 parts by weight of the thermoplastic resin.

The hardening agent may be used without any particular limitation as long as it is a known one. As a non-limiting example, amine compound, phenol resin, acid anhydride, imidazole compound, polyamine compound, hydrazide compound, dicyandiamide compound, etc. may be used alone or in combination of two or more. The hardening agent may be preferably composed of at least one material selected from an aromatic amine compound hardening agent and a phenol resin hardening agent. The aromatic amine compound hardening agent or the phenolic resin hardening agent may have the advantage of less change in adhesion property even when stored at room temperature for a long period of time. Examples of the aromatic amine compound hardening agent may include m-xylene diamine, m-phenylenediamine, diaminodiphenylmethane, diaminodiphenylsulfone, diaminodearyl diphenylmethane, diaminodiphenyl ether, 1,3-bis [(4-aminophenoxy) phenyl] sulfone, 4,4'-bis (4-aminophenoxy)-aminophenoxy) biphenyl, 1,4-bis (4-aminophenoxy) benzene, and the like, which may be used alone or in combination. Examples of the phenol resin hardening agent may include phenol novolac resin, cresol novolak resin, bisphenol A novolak resin, phenol aralkyl resin, poly-p-vinylphenol t-butylphenol novolac resin, and naphthol novolak resin, which may be used alone or in combination. The content of the hardening agent may be preferably 20 to 60 parts by weight per 100 parts by weight of at least one of the thermoplastic resin and the thermoplastic resin. When the content of the hardening agent is less than 10 parts by weight, the effect of hardening on the thermosetting resin may be insufficient and the heat resistance may be lowered. On the other hand, when the content of the hardening exceeds 60 parts by weight, the reactivity with the thermosetting resin may be high, and the physical properties such as handling and long-term storage of the magnetic field shielding unit may be deteriorated.

The hardening accelerator may be selected depending on the specific kind of the thermosetting resin and the hardening agent. In the present disclosure, there may be no particular limitation thereto. As a non-limiting example, the hardening accelerator may include amine-based, imidazole-based, phosphorus-based, boron-based, and phosphorus-boron-based ones, which may be used alone or in combination. The content of the hardening accelerator may be preferably about 0.1 to 10 parts by weight, and more preferably 0.5 to 5 parts by weight per 100 parts by weight of at least one of the thermoplastic resin and the thermoplastic resin.

The dielectrics 112 and 112' formed through the above-described dielectric composition may be formed by permeating a part of at least one of the first adhesive layer 140b and the second adhesive layer 130b, described later, into the gaps between the Fe-based alloy fragments. The composition of the dielectric 112 and 112' and the composition of at least one of the first adhesive layer 140b and the second adhesive layer 130b may be the same.

The thickness of the magnetic field shielding layer 110 including the above-described Fe-based alloy fragments 111 and the dielectric 112 may be the thickness of the Fe-based amorphous alloy ribbon which is the origin of the above-mentioned Fe-based alloy fragments. Except for the gaps between fragments and the thickness of the dielectric covering the top or bottom of some fragments, the thickness of one layer of the magnetic field shielding layer 110 may be 15 to 35 μm, but is not limited thereto.

The shape of the magnetic field shielding layer may be a circle, an ellipse, a polygonal shape such as a pentagon, etc. as well as a rectangular shape or a square shape, or a shape in which a curved line and a straight line are partly mixed, so as to correspond to the shape of the application to which the magnetic field shielding unit is applied. For example, the shape of the magnetic field shielding layer may have the same shape (Ex. Ring shape) corresponding to the shape of the radiator. Here, it is preferable that the size of the magnetic field shielding unit may be about 1 to 2 mm larger than that of the radiator.

As shown in FIG. 1 or 2, the protective member 140 including a base film 140a and a first adhesive layer 140b formed on one surface of the base film 140a may be formed on the top surface of the magnetic field shielding layer 110 or 110'. The adhesive member 130 may be provided on the bottom surface of the magnetic field shielding layer 110 or 110'.

First, the base film 140a of the protective member 140 may be a protective film typically provided in the magnetic field shielding unit. The base film 140a needs to have heat resistance enough to withstand the heat/pressure applied for hardening in the step of attaching the magnetic field shielding sheet to a substrate having the radiator. In addition, the base film 140a also needs to have mechanical strength and chemical resistance sufficient to protect the magnetic field shielding layer 110 or 110' against external physical and chemical stimuli. Any film which can meet such characteristics may be used without limitation. As non-limiting examples, the raw material of the base film 140a of the protective member 140 may include polyethylene, polypropylene, polyimide, crosslinked polypropylene, nylon, polyurethane resin, acetate, polybenzimidazole, polyimideamide, polyetherimide, polyphenylene sulfide (PPS), polyethylene terephthalate (PET), polytrimethylene terephthalate (PTT), polybutylene terephthalate (PBT), polyvinylidene fluoride (PVDF), polytetrafluoroethylene (PTFE), polychlorotrifluoroethylene (PCTFE), and polyethylene tetrafluoroethylene (ETFE) and the like, which may be used alone or in combination.

The base film 140a may have a thickness of 1 to 100 m, preferably 10 to 30 m, but is not limited thereto.

The protective member 140 may include the first adhesive layer 140b on one surface of the base film 140a. The protective member 140 may be adhered to the magnetic field shielding layer 110 through the first adhesive layer 140b. The first adhesive layer 140b may be used without limitation in case that it is a typical adhesive layer. Preferably, the first adhesive layer 140b may be the dielectric forming composition as described above, may minimize the generation of eddy currents accordingly. The first adhesive layer 140b may have an improved adhesive force by increasing the compatibility with the dielectric 112 provided in the magnetic field shielding layer 110. Accordingly, the composition of the dielectric 112 and the composition of the first adhesive layer 140b may be the same, but are not limited thereto. The thickness of the first adhesive layer 140b may be in the range of 3 to 50 μm, but is not limited thereto and may be changed according to the purpose of use.

Next, the adhesive member 130 may function to attach the magnetic field shielding unit 100 or 100' to the radiator or a substrate provided with a radiator. As shown in FIG. 1, the adhesive member 130 may include a second adhesive layer 130b for attaching the magnetic field shielding unit 100, or 100' to a surface to be attached and further include a releasing film 130a for protecting the second adhesive layer 130b. A conventionally known releasing film which can be easily removed from the second adhesive layer 130b may be used as the releasing film 130a without limitation, but the present disclosure is not particularly limited thereto.

The second adhesive layer 130b may be formed by applying an adhesive composition to the bottom surface of the magnetic field shielding layer 110 or 110'. The second adhesive layer 130b formed by applying an adhesive composition on the releasing film 130a may be attached to the magnetic field shielding layer 110 or 110'. Alternatively, the second adhesive layer 130b may be a double-sided adhesive member coated with an adhesive agent on both sides of the film-like supporting substrate for reinforcement of mechanical strength. The adhesive layer formed on the top surface of the support substrate may be attached to the bottom surface of the magnetic shielding layer 110 or 110'. The releasing film 130a may be adhered to the one adhesive layer formed on the bottom surface of the supporting substrate until the one adhesive layer is adhered to the surface to be attached.

In addition, the second adhesive layer 130b may permeate into the gaps between adjacent Fe-based alloy fragments existing on the inner side of the magnetic field shielding layer from the one adhesive layer of the attached magnetic field shielding layer, thereby partially or wholly insulating the Fe-based alloy fragments. The second adhesive layer 130b may be derived from the dielectric 112 or 112' described above, and thus the adhesive composition for forming the second adhesive layer 130b may be the dielectric forming composition described above. On the other hand, even if the second adhesive layer 130b is not derived from the dielectric 112 or 112' described above, the composition for forming the second adhesive layer 130b may be the same as the dielectric forming composition in order to improve the adhesive strength by increasing the compatibility between the second adhesive layer 130b and the dielectric 112 or 112' provided in the magnetic field shielding layer, but it is not limited thereto and may be a different composition.

The magnetic field shielding unit according to an embodiment of the present disclosure may be manufactured by a manufacturing method described below, but the present disclosure is not limited thereto.

First, step (a) of preparing a heat-treated Fe-based alloy ribbon may be performed. The Fe-based alloy ribbon may be manufactured by a known method such as rapid solidification process (RSP) by melt spinning. The manufactured Fe-based alloy ribbon may be subjected to a heat treatment process to adjust the permeability after cutting so as to have a predetermined width. The heat treatment temperature may be selected depending on the composition of the Fe-based alloy, the composition ratio, and the degree of the magnetic permeability of the desired amorphous alloy. In order to exhibit excellent physical properties over a predetermined level within a desired operating frequency range, the heat treatment may be performed with respect to the Fe-based alloy ribbon at a temperature of 300° C. to 600° C., more preferably 400° C. to 500° C., and more further preferably 440° C. to 480° C. for 30 minutes to 2 hours in an air atmosphere or a nitrogen atmosphere. If the heat treatment temperature is less than 300° C., the permeability may be too low or too high compared to the desired permeability level, which may make it difficult to be shredded into fragments due to weak fragility and the heat treatment time may be prolonged. Also, when the heat treatment temperature exceeds 600° C., the permeability may be significantly lowered.

Next, step (b) of forming the dielectric in gaps between the Fe-based alloy fragments produced by shredding the Fe-based alloy ribbon may be performed.

First, in one embodiment of the step (b), a protective member having the first adhesive layer may be adhered to one surface of the Fe-based alloy ribbon and an adhesive member having the second adhesive layer may be adhered to the other surface of the Fe-based alloy ribbon, which can provide a laminate. The laminate may be passed through the shredding device so that the Fe-based alloy ribbon may be shredded into irregular shaped fragments. Thereafter, pressure may be applied to the laminate to permeate the first adhesive layer and the second adhesive layer into the gaps between the Fe-based alloy fragments to fix and support the fragments. At the same time, the fragments may be insulated from each other to significantly reduce the generation of eddy currents and block the penetration of moisture, thereby preventing the amorphous alloy from being oxidized. The method of applying the pressure to the laminate may be carried out in such a manner that pressure is applied to the laminate together with shredding in the shredder device. Alternatively, after the laminate is shredded, a separate pressing process may be further performed to increase the degree of permeation of the first adhesive layer and the second adhesive layer.

Figure 3:
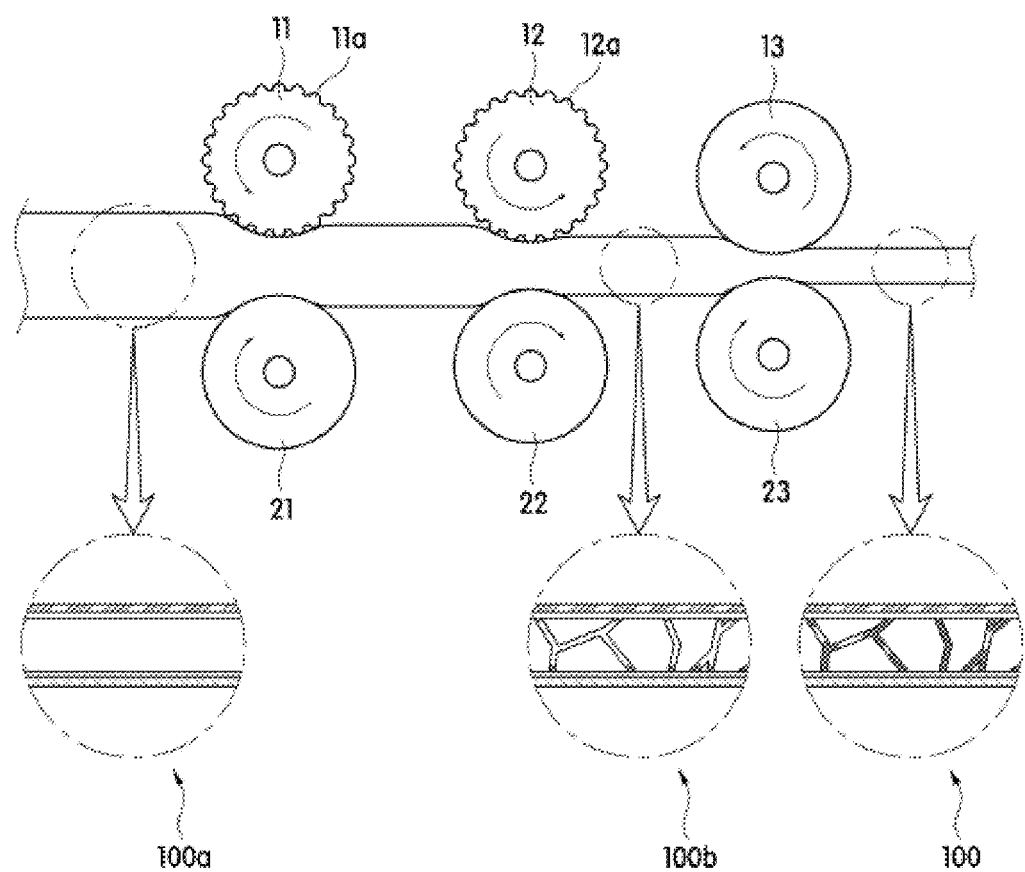
FIGS. 3 and 4 are schematic views of a manufacturing process using a shredding device for manufacturing the magnetic field shielding unit according to an embodiment of the present disclosure. In detail.

Specifically, as shown in FIG. 3, the laminate 100a may be shredded and pressurized by passing through the shredding device which includes a plurality of first rollers 11 and 12 having unevenness 11a and 12a and second rollers 21 and 22 corresponding to the first rollers 11 and 12, respectively. The magnetic field shielding unit 100 may be produced by further pressing the shredded laminate 100b through a third roller 13 and a fourth roller 23 corresponding to the third roller 13.

Figure 4:
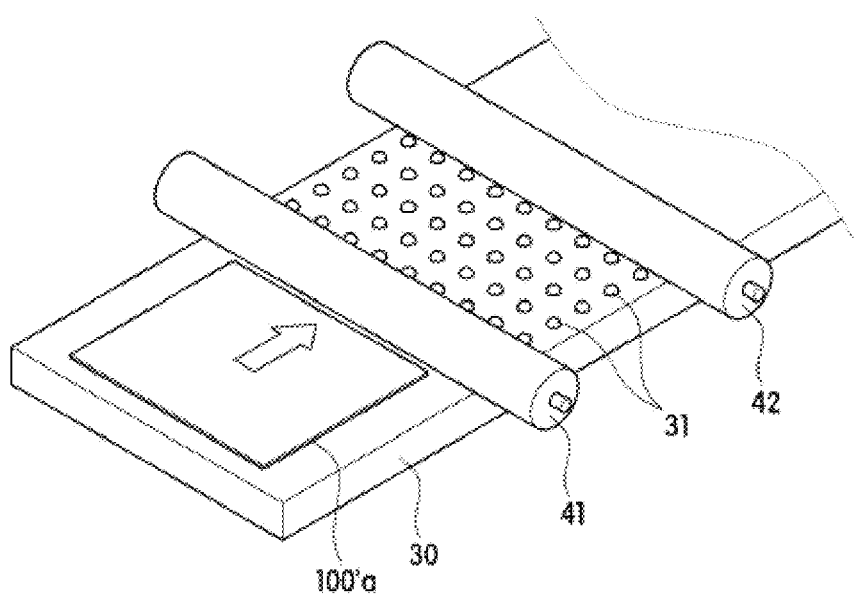

As shown in FIG. 4, the laminate 100a including the Fe-based alloy ribbon sheet may be fed into the shredding device which is provided with a support plate 30 having a plurality of metal balls 31 on one surface thereof and rollers 41 and 42 disposed on the upper portion of the support plate 30 for moving the Fe-based alloy ribbon sheet to be shredded. Pressure may be applied through the metal ball 31 to shred the ribbon sheet. The shape of the metal ball 31 may be spherical, but is not limited thereto, may be a triangle, a polygon, an ellipse, or the like. The shape of the metal ball 31 formed on the first roller may be one shape or a mixture of various shapes.

Figure 5:
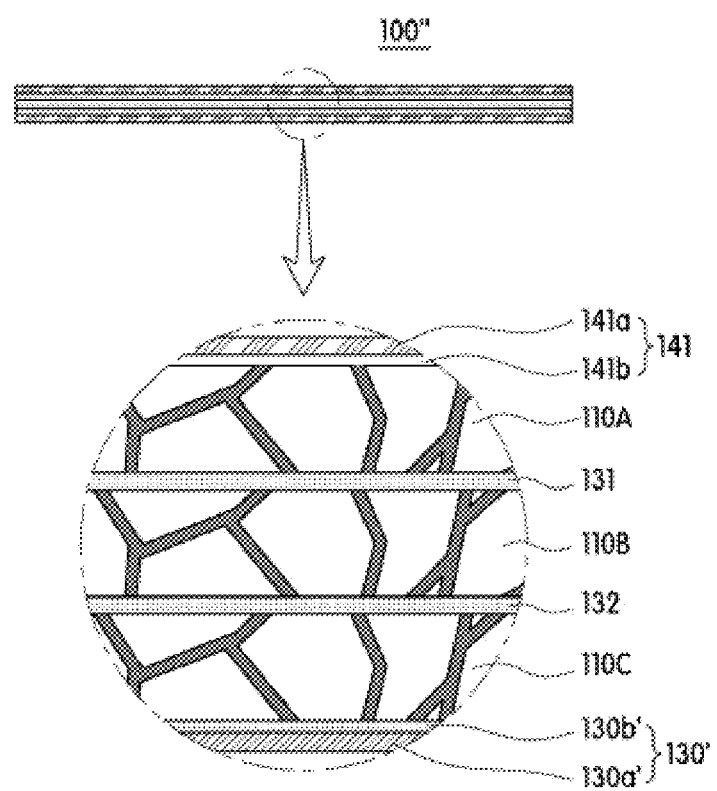
FIG. 5 is a cross-sectional view of a magnetic field shielding unit for the wireless power transmission according to an embodiment of the present disclosure having three magnetic field shielding layers including Fe-based alloy fragments.

Meanwhile, as shown in FIG. 5, a plurality of magnetic shielding layers 110A, 110B and 110C may be provided in the magnetic field shielding unit 100". Dielectric layers 131 and 132 for reducing eddy currents may be interposed between adjacent magnetic field shielding layers 110A/110B and 110B/110C. In some cases, when the magnetic field shielding unit is implemented by providing only a single magnetic field shielding layer which is combined with a radiator for the magnetic resonance based wireless power transmission, the desired transmission efficiency of the power signal through the magnetic resonance method may not be obtained. Further it may be insufficient to prevent interference of transmission and reception of a power signal to the radiator due to the conductor which may be located near the radiator. Accordingly, the magnetic field shielding unit according to an embodiment of the present disclosure may include a plurality of magnetic field shielding layers to increase the magnetic-shielding capacity, thereby preventing the conductor from interfering with transmission and reception of power signals on the radiator. Further, the inductance of the radiator for wireless power transmission can be further improved, while the specific resistance can be increased relatively little, thereby making it possible to develop a high quality index, and thus be more suitable for achieving excellent wireless power transmission efficiency and transmission distance.

When a plurality of magnetic field shielding layers are provided in the magnetic field shielding unit, the number of magnetic field shielding layer may include 2 to 10 layers, more preferably 2 to 4 layers, but is not limited thereto. On the other hand, even increasing the number of laminating of the magnetic shielding layer infinitely, the desired level of physical properties may not be achieved. If the number of laminating of the magnetic field shielding layer exceeds 10, the degree of increase of the specific resistance is significantly greater than the degree of increase of the inductance of the radiator for wireless power transmission, so that the quality index of the radiator may not be improved. Further, its thickness may become thicker, which may be undesirable in reducing the thickness of the magnetic field shielding unit.

As shown in FIG. 5, when a plurality of magnetic shielding layers 110A, 110B and 110C are provided, dielectric layers 131 and 132 may be interposed between adjacent magnetic shielding layers 110A/110B and 110B/110C to reduce eddy currents. The dielectric layers 131 and 132 may be an insulating adhesive layer. Here, the insulating adhesive layer may be formed using the dielectric forming composition described above. Specifically, a plurality of Fe-based alloy ribbon may be laminated via the insulating adhesive layers 131 and 132 and then the ribbon may be shredded to form a magnetic field shielding unit 100 having a plurality of magnetic field shielding layers 110A, 110B and 110C. In this case, the dielectric included in the upper portion of the second magnetic shielding layer 110B and the lower portion of the first magnetic shielding layer 110A adjacent to the second magnetic shielding layer 110B may be formed by permeating the insulating adhesive layer 131 interposed between the two magnetic field shielding layers 110A and 110B into the gaps between Fe-based fragments disposed on the lower portion of the first magnetic field shielding layer 110A and on the upper portion of the second magnetic field shielding layer 110B. Preferably, the thickness of the insulating adhesive layers 131 and 132 may be larger or the same as that of the first adhesive layer 130b of the protective member 130b and/or that of the second adhesion layer 140b of the adhesive member 140b both of which are provided on the upper portion and the lower portion of the laminated magnetic field shielding layers 110A, 110B and 110C, respectively, but is not limited thereto.

In another embodiment, the dielectric layers 131 and 132 may be a heat-radiating adhesive layer. The heat radiating adhesive layer may be formed by mixing a known heat radiating filler such as nickel, silver, or carbon with an adhesive component such as acrylic, urethane, epoxy or the like. Since the specific composition and content can be determined according to known composition and content, it is not particularly limited in the present disclosure.

When a plurality of the magnetic field shielding layers 110A, 110B, and 110C are provided, the composition of the Fe-based alloy included in the respective magnetic field shielding layer may be the same or different from each other. Also, even though the composition is the same, the magnetic permeability of each of the magnetic shielding layers may be different due to the difference in the heat treatment time and the like. The thickness of each of the magnetic field shielding layers may be the same or different from each other depending on the purpose.

In the meantime, the magnetic field shielding unit 100, 100', or 100" for wireless power transmission according to the above-described embodiments of the present disclosure may include at least one functional layer (not shown) for shielding the electromagnetic waves and/or radiating the heat. Accordingly, the magnetic field shielding unit having the functional layer may prevent the frequency fluctuation range of the radiator, which is combined due to the electromagnetic wave such as power supply noise, from being significantly increased, thereby reducing the defecting rate of the radiator. It is also possible to prevent a deterioration of durability of components due to heat generation, a deterioration of function, and a discomfort caused by heat transfer to the user. In addition, if the functional layer provided on the top and/or bottom of the magnetic field shielding unit has a heat-radiating function, the thermal conductivity of the magnetic field shielding unit in the horizontal direction may be improved. In addition, since the magnetic field shielding layer included in the magnetic field shielding unit includes air in the gaps between the fragments, the thermal conductivity of the magnetic field shielding layer in the vertical direction may be suppressed due to the adiabatic effect by the air in the micro-spaces between the fragments.

Specifically, a functional layer such as an electromagnetic wave shielding layer, a heat radiating layer, and/or a composite layer in which these are stacked or a composite layer in which these layers are combined as a single layer may be provided on the upper portion of the protective member 130 of the magnetic field shielding layer 100 and/or on lower portion of the adhesive member 140. For example, a metal foil such as copper, aluminum, or the like, which is excellent in thermal conductivity and conductivity, may be attached to the upper portion of the protective member 130 through an adhesive agent or a double-sided tape. Or, Cu, Ni, Ag, Al, Au, Sn, Zn, Mn, Mg, Cr, Tw, Ti or the combination of these metals may be formed on the protective member 130 by a known method such as sputtering, vacuum deposition, chemical vapor deposition, or the like to form a metal thin film. When the functional layer is provided through an adhesive agent, the adhesive agent may be a known adhesive agent. As a non-limiting example, acrylic-based, urethane-based or epoxy-based adhesives may be used. On the other hand, a heat radiating function may be added to the above adhesive agent. For this purpose, a known filler such as nickel, silver or carbon material may be mixed with the adhesive agent. The content of the filler may be such that the adhesive agent performance of the adhesive agent may not be deteriorated and the heat radiating performance can be exhibited. But the filler is not particularly limited thereto.

In addition, the thickness of the functional layer may be in the range of 5 µm to 100 µm, and more preferably 10 µD to 20 µD in order to reduce the thickness of the magnetic field shielding unit.

The second radiator may be disposed on one surface of the magnetic field shielding unit. A copper plate having a thickness of 30 µm may be disposed on the other surface of the magnetic field shielding unit. A bifilar coil using two first radiators spaced a predetermined distance in parallel to the second radiator may be disposed. In these conditions, when a wireless power signal is transmitted by applying an input voltage of 6 V of a driving frequency of 750 kHz to the bifilar coil, the maximum receiving distance at which the second radiator can receive the wireless power signal may be 58 mm or more. The first radiator and the second radiator may be the radiators formed by 5 turns of a copper coil having a diameter of 500 µm. These radiators may have an outer diameter of 50.5 mm×50.5 mm, an inner diameter of 50 mm×50 mm, and a circular shape. These radiators may have an inductance (Ls) of 3.1 to 3.15 pH and a specific resistance (Rs) of 350 to 400 mΩ when measured with an LCR meter under the condition of 750 kHz/1 V. The values of the inductance and the specific resistance may be results measured with an LCR meter for the same radiator, and the error ranges may be considered as the measured values are not constant for each measurement.

The magnetic field shielding unit according to an embodiment of the present disclosure may prevent reception interference of the wireless power signal transmitted by the copper plate although he magnetic field shielding unit is in close contact with the copper plate having a thickness of 30 µm so that the radiator may receive the wireless power signal. The magnetic field shielding unit may have an excellent wireless power reception distance as the maximum reception distance is 58 mm or more. In addition, the maximum receiving distance may be within, for example, 2 m.

Figure 6:
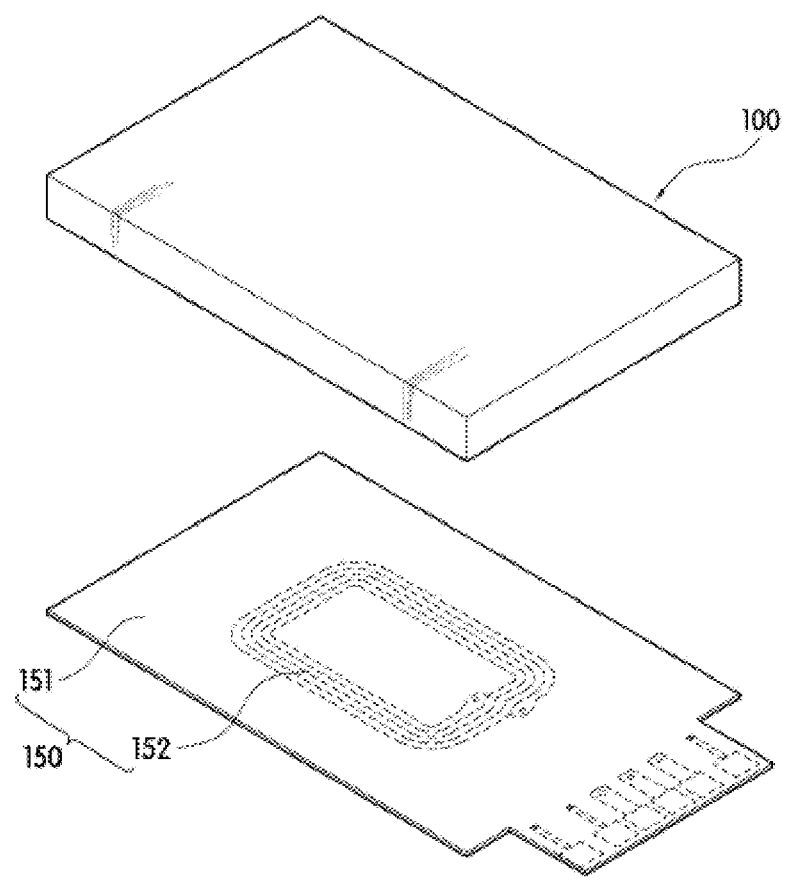
FIG. 6 is an exploded perspective view of a wireless power transmission module according to an embodiment of the present disclosure.

As shown in FIG. 6, the magnetic shielding unit 100, 100', or 100" for a wireless power transmission operating in the magnetic resonance method may be applied to the wireless power transmission module operable in the magnetic resonance method including the magnetic field shielding unit 100' and the radiator unit 150 having the wireless power transmission radiator 152. Here, the wireless power transmission module may be the wireless power transmission module that transmits the wireless power signal to the electronic device or the wireless power receiving module that receives the wireless power signal from a wireless power transmitting module. The radiator 152 for the wireless power transmission may be a radiator coil wound by a coil having a predetermined inner diameter, or a radiator pattern printed on a substrate. The shape, structure, size, material, etc. of the radiator for wireless power transmission may not be particularly limited in the present disclosure. Further, the radiator 152 for wireless power transmission may be a radiator for wireless power transmission operable in the magnetic resonance method and may further include a radiator for wireless power transmission operable in a magnetic induction method.

Meanwhile, the wireless power transmission module operating in the magnetic resonance method may be advantageous in preventing interference of transmission and reception of a wireless power signal from a conductor through a structure in which a radiator for wireless power transmission is disposed on a surface of a magnetic shielding unit. In the case of the module structured such that the radiator for wireless power transmission is structurally wound around the outside of the magnetic shielding unit, it may not be possible to prevent the interference of the transmission and reception of the wireless power signal from the conductor to the desired level. In this case, the transmission/reception distance and/or the transmission efficiency of the wireless power signal may be significantly reduced, or the wireless power signal transmission/reception function may not be exerted.

Figure 7:
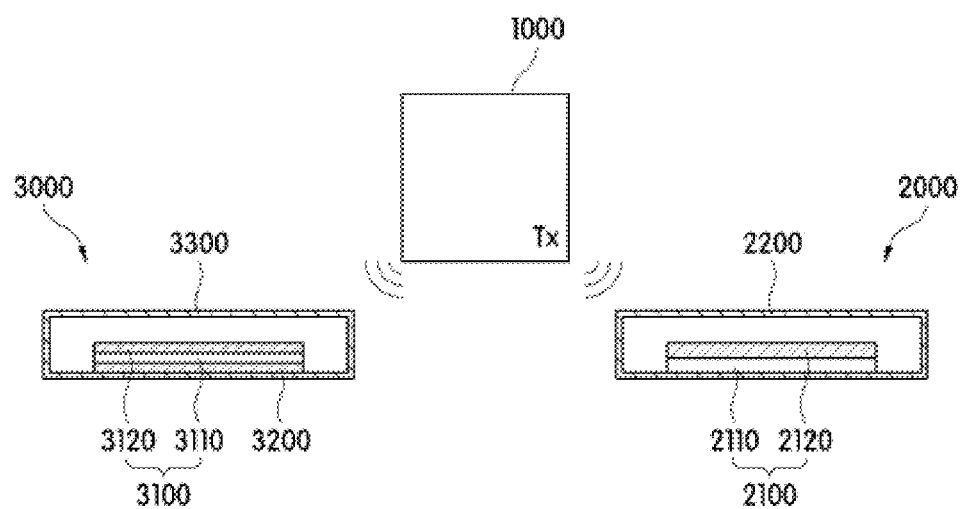
FIG. 7 is a schematic diagram of the wireless power transmission module and a portable device according to an embodiment of the present disclosure.

As shown in FIG. 7, an embodiment of the present disclosure may be implemented in portable devices 2000 and 3000 including the above-described the wireless power transmission modules 2100 and 3100 as wireless power receiving modules. In the arrangement of the magnetic field shielding unit 2110 or 3110 in the wireless power transmission module 2100 or 3100, when the wireless power signal is received at the reception radiating unit 2120 inside the portable equipment 2000 via the outer metal case 2200 of the portable device 200, the magnetic field shielding unit 2110 may be disposed between the metal case 2200 and the receiving radiator unit 2120. Even in this arrangement, interference of transmission and reception of a wireless power signal due to the metal case can be blocked, so that the desired wireless power transmission in magnetic resonance method may be achieved. When the signal generated from the wireless power transmission module 1000 is received by a receiving radiator unit 3120 through a non-conductive external case 3300 of the portable device 3000, a magnetic field shielding unit 3110 may be disposed between a conductive part 3200 and the receiving radiator unit 3120 even when the conductive part 3200 such as a battery is disposed around the radiator unit 3120. Even in this arrangement, it is possible to transfer desired wireless power transmission in the magnetic resonance method by preventing the interference of the transmission/reception of the wireless power signal due to the built-in parts of the metal.

According to a preferred embodiment of the present invention, a copper plate having a thickness of 30 µm may be disposed on a surface of the wireless power transmission module on a side of the magnetic field shielding unit. A bifilar coil using two first radiators may be disposed at a predetermined distance from one surface of the wireless power transmission module on a side of the radiator. In these conditions, when a wireless power signal is transmitted by applying an input voltage of 6 V of a driving frequency of 750 kHz to the bifilar coil, the maximum receiving distance at which the second radiator can receive the wireless power signal may be 58 mm or more. The values of the inductance and the specific resistance may be results measured with the LCR meter for the same radiator, and the error ranges may be considered as the measured values are not constant for each measurement.

The magnetic field shielding unit according to an embodiment of the present disclosure may prevent interference with the reception of the transmitted wireless power signal by the copper plate despite being in close contact with the copper plate having a thickness of 30 µm, so that the radiator may receive the wireless power signal. The magnetic field shielding unit may have an excellent wireless power reception distance as the maximum reception distance is 58 mm or more.

THE EMBODIMENTS OF PRESENT DISCLOSURE

The present disclosure will now be described more specifically with reference to the following embodiment of exemplary examples. However, the following the embodiment of exemplary examples should not be construed as limiting the scope of the present disclosure, and should be construed to facilitate understanding of the present disclosure.

<Exemplary Embodiment 1>

Figure 9:
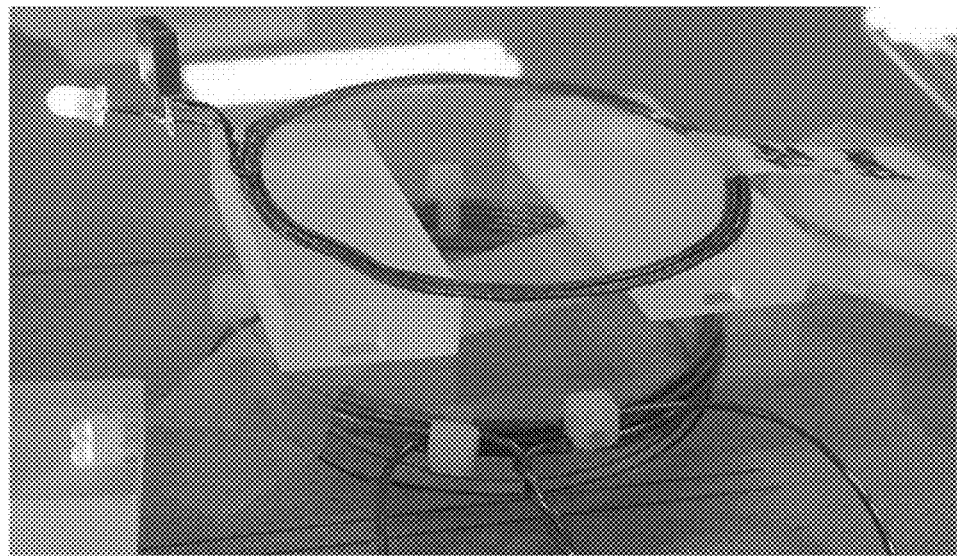
FIG. 9 is a picture showing an arrangement of the wireless power transmitting and receiving radiators in order to simulate the possibility of the magnetic resonance based wireless power transmission, where the picture shows that when a voltage of 6V of 750 kHz is applied to the transmitting radiator, a LED connected to the receiving radiator is lit by the magnetic resonance.

After preparing of the $Fe_{73.5}Si_{13.5}B_9CuNb_3$ amorphous alloy ribbon by the rapid quenching method (RSP) through melt spinning, a ribbon sheet having a thickness of 24 μm cut into a sheet shape was heat-treated at 610° C. in an N2 atmosphere for 1 hour. Two sheets of the above-mentioned ribbon sheets were then laminated, and a double-sided tape (support base PET, KYWON CORPORATION, VT-8210C) having a thickness of 10 μm was laminated between the ribbon sheets. Thereafter, a PET protective member (International Latex, KJ-0714) having a thickness of 7 μm and an adhesive layer formed on one surface was attached to one surface of the laminated ribbon sheet. As shown in FIGS. 4 and 9, the shredded device was passed three times to manufacture a magnetic field shielding unit having a permeability of 200 as shown in Table 2 below.

<Exemplary Embodiments 2 to 13>

A magnetic field shielding unit as shown in Table 2 or Table 3 was prepared in the same manner as in the exemplary embodiment 1, however, the permeability of the ribbon sheet and/or the number of laminated layers of the ribbon sheet were changed as shown in Table 2 or Table 3 below.

<Exemplary Embodiment 14>

Figure 8:
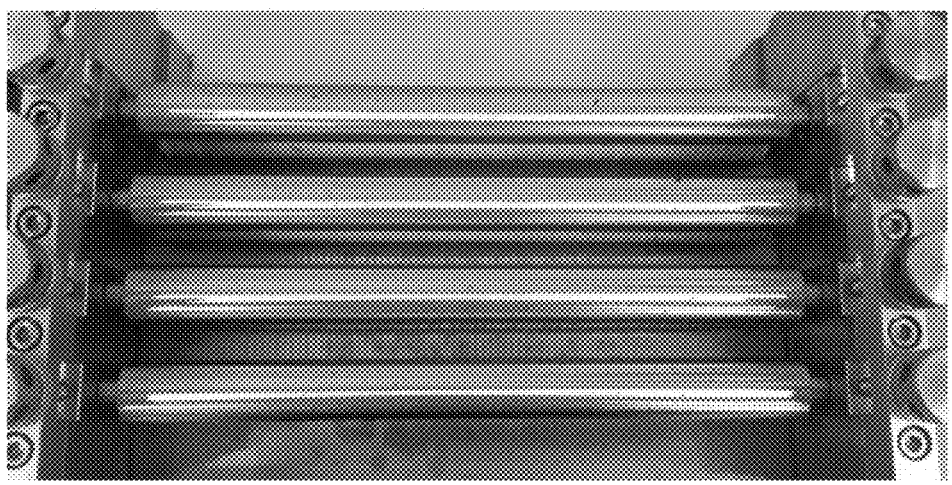
FIG. 8 is a picture showing a top view of the shredding device according to FIG. 4 used in manufacturing the magnetic field shielding unit according to the embodiment of the present disclosure.

After preparing of the $Fe_{73.5}Si_{13.5}B_9CuNb_3$ amorphous alloy ribbon by the rapid quenching method (RSP) through melt spinning, a ribbon sheet having a thickness of 24 μm cut into a sheet shape was heat-treated at 610° C. in an N2 atmosphere for 1 hour. Two sheets of the above-mentioned ribbon sheets were then laminated, and a double-sided tape (support base PET, KYWON CORPORATION, VT-8210C) having a thickness of 10 mu m was laminated between the ribbon sheets. Thereafter, a PET protective member (International Latex, KJ-0714) having a thickness of 7 μm and an adhesive layer formed on one surface was attached to one surface of the laminated ribbon sheet. As shown in FIGS. 4 and 8, the shredded device was passed three times to manufacture a magnetic field shielding unit having a permeability of 110 as shown in Table 4 below.

<Exemplary Embodiments 15 to 19>

A magnetic field shielding unit as shown in Table 4 was prepared in the same manner as in the exemplary embodiment 14. However, the permeability of the ribbon sheet and/or the number of laminated layers of the ribbon sheet were changed as shown in Table 4 below.

COMPARATIVE EXAMPLES 1 to 7

A Ni—Zn ferrite sheet (manufactured by AmogreenTech) having a thickness and a permeability of the product name as shown in Table 5 below was prepared.

EXPERIMENTAL EXAMPLE 1

As shown in FIG. 9, in order to confirm whether or not the conductors interfere with transmission and reception of a wireless power signal by magnetic resonance, a bifilar coil using two first radiators was used as a wireless power transmitting radiator, and the second radiator was disposed at a distance from the first radiator to a predetermined distance therefrom, and a copper plate with a thickness of 30 μm was placed on the top of the radio power receiving radiator as a conductor. After transmitting the wireless power signal by applying a driving frequency of 750 kHz and an input voltage of 6 V to the wireless power transmitting radiator, it was confirmed whether the LED connected to the wireless power receiving radiator was turned on. Experiments were conducted while varying the distance between the wireless power receiving radiator and the copper plate, and the results are shown in Tables 1, 9 and 10 below.

* The first radiator and the second radiator

The first radiator and the second radiator formed by turning 5 times as one strand of a copper coil having a diameter of 500 μm may have an outer diameter of 50.5 mm×50.5 mm, an inner diameter of 50 mm×50 mm and a circle shape, and may have an inductance (Ls) of 3.1 to 3.15 μH and a specific resistance (Rs) of 350 to 400 mΩ when measured with an LCR meter under the condition of 750 kHz/1V. The values of the inductance and the specific resistance may be results measured with an LCR meter for the same radiator, and the error ranges may be considered as values are not constant for each measurement.

TABLE 1

| Distance between Tx and Rx radiators (mm) | Distance between wireless power receiving radiator and copper plate (mm) | Whether LED is turned on or not |
|---|---|---|
| 11.6 | 0 | OFF |
| 11.6 | 1.7 | OFF |
| 11.6 | 4.8 | OFF |
| 11.6 | 8 | OFF |
| 11.6 | 12.3 | OFF |

As can be seen in Table 1, despite the very narrow distance between the wireless power transmitting radiator and the wireless power receiving radiator, the LED did not light up. The LED did not light up even if the distance between the wireless power receiving radiator and the copper plate as the conductor was getting distant. Thus, confirming that the copper plate interferes with the reception of the wireless power signal from the wireless power transmitting radiator to the wireless power receiving radiator.

Figure 10:
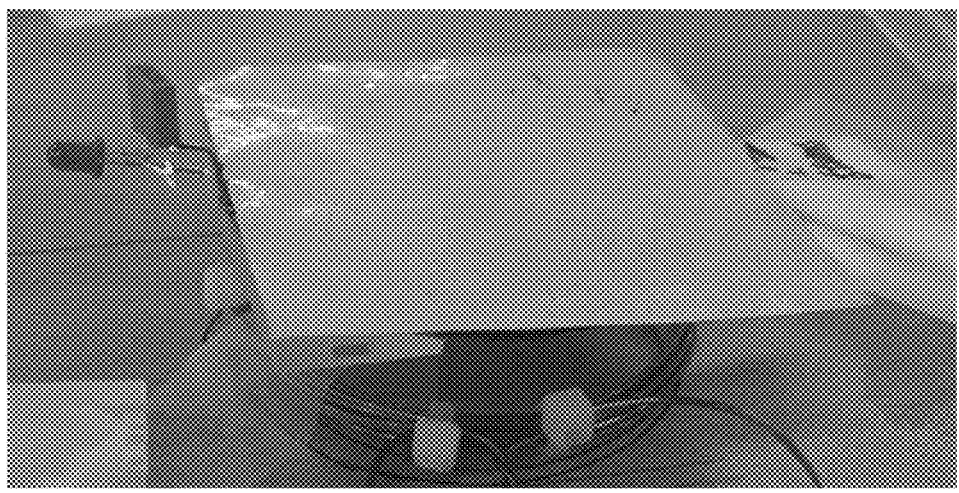
FIG. 10 is a picture showing that the LED connected to the receiving radiator is turned OFF when a voltage of 6V of 750 kHz is applied to the transmitting radiator after a copper plate, as the conductor, is placed above the wireless power receiving radiator in order to simulate whether or not the conductor around the radiators obstructs the transmission and reception of a power signal for the wireless power transmission operating in the magnetic resonance method.
Figure 11:
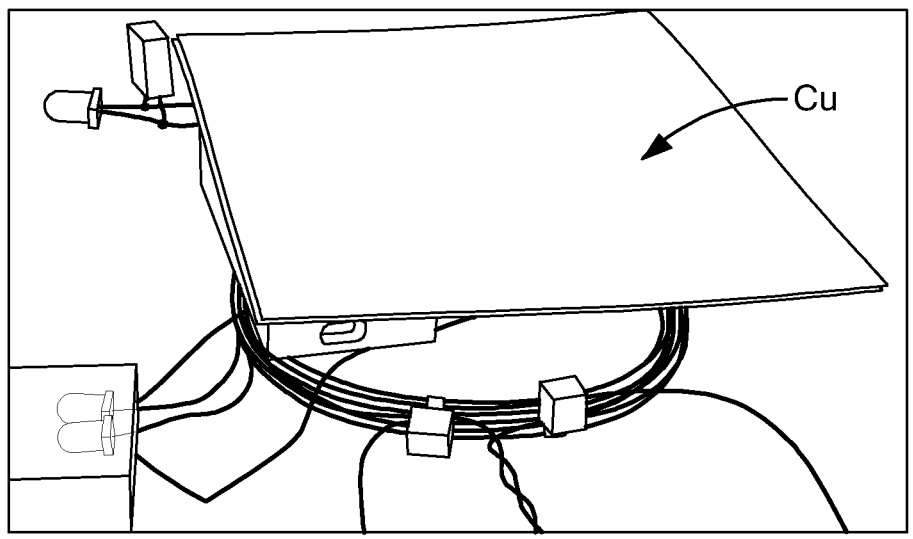
FIG. 11 is a picture showing that the LED connected to the receiving radiator is turned ON when the voltage of 6V of 750 kHz is applied to the transmitting radiator after the magnetic field shielding unit is placed between the copper plate and the wireless power receiving radiator, in order to simulate whether or not the magnetic field shielding unit according to an embodiment of the present disclosure prevents interference of power signal transmission and reception due to the copper plate conductor around the radiators.

Further, as can be seen from FIG. 9, when the copper plate as the conductor was not disposed, it is confirmed that the LED was turned on through magnetic resonance. However, as can be seen from FIG. 10, when the copper plate as the conductor was placed on the wireless power receiving radiator, it can be confirmed that the LED was turned off.

EXPERIMENTAL EXAMPLE 2

In order to evaluate the power transmission and reception distances of the magnetic resonance method for the magnetic shielding units manufactured in the exemplary embodiments 1 to 19 and the comparative examples, the following simulation evaluation was carried out.

As shown in FIG. 9, in order to confirm whether or not the conductors interfere with transmission and reception of a wireless power signal by magnetic resonance, a bifilar coil of the experimental example 1 using two first radiators was used as a wireless power transmitting radiator, and the second radiator of the experimental example 1 was disposed at a distance from the first radiator to a predetermined distance therefrom, and the copper plate with a thickness of 30 μm was placed on the top of the radio power receiving radiator as the conductor.

After transmitting the wireless power signal by applying a driving frequency of 750 kHz and an input voltage of 6 V to the wireless power transmitting radiator, it was confirmed whether the LED connected to the wireless power receiving radiator is turned on. The distance between the wireless power transmitting radiator and the wireless power receiving radiator where the light was no longer turned on was measured and shown in Tables 2 to 5 below.

TABLE 2

(Ex: Exemplary)

| Fe-based alloy composition ($Fe_{73.5}Si_{13.5}B_9Cu_1Nb_3$) | Ex-embodiment 1 | Ex-embodiment 2 | Ex-embodiment 3 | Ex-embodiment 4 | Ex-embodiment 5 | Ex-embodiment 6 | Ex-embodiment 7 | Ex-embodiment 8 |
|---|---|---|---|---|---|---|---|---|
| Heat treatment temperature of amorphous alloy (° C.) | 631 | 631 | 635 | 629 | 627 | 627 | 625 | 625 |
| Permeability of magnetic field shielding layer after shredding | 200 | 200 | 110 | 350 | 500 | 500 | 670 | 670 |
| Number of laminated ribbon sheet | 2 | 3 | 4 | 2 | 1 | 2 | 1 | 2 |
| Total thickness of magnetic field shielding layer only (μm) | 48 | 72 | 96 | 48 | 24 | 48 | 24 | 48 |
| Distance between wireless power transmitting and receiving radiators where LED is turned on (mm) | 62.6 | 61.6 | 65.6 | 58.6 | 60.6 | 47.6 | 60.6 | 49.6 |

TABLE 3

| Fe-based alloy composition ($Fe_{73.5}Si_{13.5}B_9Cu_1Nb_3$) | Ex-embodiment 9 | Ex-embodiment 10 | Ex-embodiment 11 | Ex-embodiment 12 | Ex-embodiment 13 |
|---|---|---|---|---|---|
| Heat treatment temperature of amorphous alloy (° C.) | 633 | 631 | 629 | 629 | 610 |
| Permeability of magnetic field shielding layer after shredding | 110 | 200 | 350 | 350 | 1250 |
| Number of laminated ribbon sheet | 3 | 4 | 1 | 3 | 2 |
| Total thickness of magnetic field shielding layer only (μm) | 72 | 96 | 24 | 72 | 48 |
| Distance between the wireless power transmitting and receiving radiators where LED is turned on (mm) | 49.1 | 51.8 | 51.6 | 50.6 | 44.6 |

TABLE 4

| Fe-based alloy composition ($Fe_{91.6}Si_2B_6Co_{0.2}Ni_{0.2}$) | Ex-embodiment 14 | Ex-embodiment 15 | Ex-embodiment 16 | Ex-embodiment 17 | Ex-embodiment 18 | Ex-embodiment 19 |
|---|---|---|---|---|---|---|
| Heat treatment temperature of amorphous alloy (° C.) | 460 | 460 | 458 | 456 | 454 | 452 |
| Permeability of magnetic field shielding layer after shredding | 110 | 110 | 200 | 350 | 500 | 670 |
| Number of laminated ribbon sheet | 3 | 4 | 2 | 2 | 1 | 2 |
| Total thickness of magnetic field shielding layer only (μm) | 72 | 72 | 48 | 48 | 24 | 48 |
| Distance between wireless power transmitting and receiving radiators where LED is turned on (mm) | 68.1 | 69.6 | 62.8 | 60.4 | 52.2 | 45.6 |

TABLE 5

|  | Comparative example 1 | Comparative example 2 | Comparative example 3 | Comparative example 4 | Comparative example 5 | Comparative example 6 | Comparative example 7 |
|---|---|---|---|---|---|---|---|
| Ferrite (Ni—Zn based) product name | AFS-100-R40 | AFS-150-R40 | AFS-250-R30 | AFS-550-R40 | AFS-800-R30 | AFS-100-R200 | AFS-150-R20 |
| Permeability | 100 | 150 | 250 | 550 | 800 | 100 | 150 |
| Total thickness of magnetic field shielding layer only (μm) | 40 | 40 | 30 | 40 | 30 | 200 | 200 |
| Distance between wireless power transmitting and receiving radiators where LED is turned on (mm) | 20 | 24 | 30 | 40 | 33 | 49.6 | 53.6 |

As can be seen from Tables 2 to 4, even the copper plates as the conductor was disposed adjacent to each other, the magnetic field shielding unit having the Fe-based alloy interfered with transmission and reception of the wireless power signal according to the copper plate (see Table 1). It can be confirmed that the wireless power signal was transmitted and received and the transmission/reception distance was also excellent.

However, in the case of the Fe-based alloy, the transmission and reception distance of the wireless power signal is not improved as the magnetic permeability is larger and the total thickness of the magnetic field shielding layer is thicker. It can be seen that it is advantageous to secure the transmission/reception distance of the extended wireless power signal because the magnetic field shielding layer is realized with a proper thickness for each magnetic permeability.

As can be seen from Table 5, even in the case of the magnetic shielding unit using ferrite as a magnetic material, interference of the transmission and reception of the wireless power signal according to the copper plate is blocked, but the degree of weakness and/or improvement of characteristics of the radiator are small. Therefore, the transmission/reception distance of the wireless power signal is shorter than that of the embodiment and the wireless power transmission/reception distance in the magnetic field shielding layer of the same thickness is remarkably short compared with the embodiment. Therefore, the magnetic field shielding layer derived from the Fe-based amorphous alloy ribbon is more advantageous for improving the antenna characteristics of the wireless power transmission radiator and interference transmission/reception due to the conductor. It is possible to realize a thinned magnetic field shielding unit, which is advantageous for realizing a slimmer portable electronic device.

<Exemplary Embodiments 20 to 25>

A magnetic field shielding unit as shown in Table 6 was prepared in the same manner as in the exemplary embodiment 18. However, the number of shredding of the $Fe_{91.6}Si_2B_6Co_{0.2}Ni_{0.2}$ ribbon sheet having a permeability of 500 was varied as shown in Table 6 below.

EXPERIMENTAL EXAMPLE 2

The following properties of the magnetic field shielding unit according to exemplary embodiments 20 to 25 were evaluated and shown in Table 6.

1. Analysis of Particle Diameter Size Distribution.

After peeling the adhesive protective film provided on one surface of the magnetic field shielding unit of 50 mm×50 mm in width and length, the particle diameter sizes were measured with an optical microscope to count the number of fragments having a particle diameter size of less than 500 μm and the number of fragments having a particle diameter size of less than 100 μm. the number of fragments having a particle diameter size of less than 500 μm and the number of fragments having a particle diameter size of less than 100 μm were calculated in comparison with the total number of fragments. At this time, the average particle diameter sizes of five specimens were measured by measuring the particle diameters of five specimens.

2. The Power Transmission/Reception Distance Evaluation of Magnetic Resonance Method A magnetic field shielding module was implemented as in Experimental Example 1, and a power transmission/reception distance of the magnetic resonance method was evaluated in the same manner as Experimental Example 1. At this time, a magnetic field shielding module was implemented for each of five specimens of each example used in the evaluation of particle diameter size distribution, and the average distance was calculated after evaluating each transmission/reception distance.

TABLE 6

|  |  | Exemplary embodiment 20 | Exemplary embodiment 21 | Exemplary embodiment 22 | Exemplary embodiment 23 | Exemplary embodiment 24 | Exemplary embodiment 25 |
|---|---|---|---|---|---|---|---|
| Ribbon sheet permeability before shredding | | 500 | 500 | 500 | 500 | 500 | 500 |
| Number of layers | | 1 | 1 | 1 | 1 | 1 | 1 |
| Number of shredding | | 3 | 4 | 7 | 9 | 2 | 1 |
| Distribution of particle diameter size | Less than 500 μm diameter size (%) | 77 | 82 | 100 | 100 | 46 | 32 |
| | Less than 500 μm diameter size (%) | 4 | 17 | 44 | 53 | 0 | 0 |
| Average distance between the wireless power transmitting and receiving radiators at which LED is turned off (mm) | | 51.6 | 58.3 | 61.1 | 53.5 | 50.8 | 38.2 |

As can be seen from Table 6, it can be seen that the wireless power transmission/reception distance can be changed according to the particle diameter size distribution of the shredded fragments. It can be seen that the characteristic of the wireless power transmitting and receiving radiator was changed according to the fragmentation tendency. In the case of exemplary embodiment 25, it can be confirmed that the average distance of transmission and reception of the wireless power signal was lowered as the ratio of fragments having a particle diameter of less than 500 μm was less than 40%. In the case of exemplary embodiment 23 23, it can be seen that the average distance of transmission/reception of wireless power signals was decreased because the number of fragments were increased.

As described above, the present disclosure has been described with respect to particularly preferred embodiments. However, the present disclosure is not limited to the above embodiments, and it is possible for one who has an ordinary skill in the art to make various modifications and variations, without departing off the spirit of the present disclosure.

What is claimed is:

1. A wireless power transmission module, comprising:
   a radiator for wireless power transmission, the radiator being disposed adjacent to a conductor; and
   a magnetic shield, disposed on a side of the radiator, for preventing disturbance of transmission and reception of the radiator due to the conductor and improving radiator characteristics, the magnetic shield including a magnetic field shielding layer which includes shredded Fe-based alloy fragments and a dielectric filling at least a part of gaps between shredded Fe-based alloy fragments and some adjacent ones of the fragments to reduce eddy currents, to improve flexibility of and reduce eddy currents in the magnetic shield,
   wherein a number of the Fe-based alloy fragments of which diameters are less than 500 μm accounts for 40% or more of a total number of the Fe-based alloy fragments in the magnetic field shielding layer,
   wherein the magnetic shield includes one or more additional magnetic field shielding layers, and a dielectric layer interposed between adjacent magnetic shielding layers to adhere the adjacent magnetic field shielding layers to each other and reduce eddy currents,
   wherein the dielectric layer is an insulating adhesive layer or a heat-radiating adhesive layer.

2. The wireless power transmission module of claim 1, wherein the magnetic shield further includes a protective member disposed on one surface of the magnetic field shielding layer and an adhesive member disposed on the other surface of the magnetic field shielding layer.

3. The wireless power transmission module of claim 2, wherein the protective member is adhered to one surface of the magnetic field shielding layer through a first adhesive layer provided on one surface of the protective member, the adhesive member is adhered to the other surface of the magnetic field shielding layer through a second adhesive layer provided on one surface of the adhesive member, and the dielectric included in the magnetic field shielding layer is formed such that a part of at least one of the first adhesive layer and the second adhesive layer permeates into the gaps between adjacent the Fe-based alloy fragments.

4. The wireless power transmission module of claim 1, wherein the dielectric is filled in all of the gaps between adjacent Fe-based alloy fragments.

5. The wireless power transmission module of claim 1, wherein the Fe-based alloy fragments are derived from a Fe-based amorphous alloy ribbon and the Fe-based alloy is a 3-element based alloy including iron (Fe), silicon (Si) and boron (B), or a 5-element based alloy including iron (Fe), silicon (Si), boron (B), copper (Cu), and niobium (Nb).

6. The wireless power transmission module of claim 1, wherein the Fe-based alloy is a 3-element based alloy including iron (Fe), silicon (Si) and boron (B), or a 5-element based alloy including iron (Fe), silicon (Si), boron (B), copper (Cu), and niobium (Nb).

7. The wireless power transmission module operable of claim 1, wherein a single layer of the magnetic field shielding layer has a thickness of 15 to 35 μm.

8. The wireless power transmission module of claim 1, wherein a number of the Fe-based alloy fragments of which diameters are less than 50 μm accounts for 50% or less of the total number of the Fe-based alloy fragments.

9. The wireless power transmission module of claim 1, wherein a copper plate having a thickness of 30 μm is disposed as the conductor on one surface of the wireless power transmission module shield and a bifilar coil including two first radiators is disposed at predetermined distance from one surface of the wireless power transmission module on a side of the radiator, and wherein When a wireless power signal is transmitted by applying an input voltage of 6 V of a driving frequency of 750 kHz to the bifilar coil, a maximum receiving distance at which the wireless power transmission module having the second radiator as the radiator for wireless power transmission can receive the wireless power signal is 58 mm or more.

10. A magnetic shield for wireless power transmission, comprising a magnetic field shielding layer including Fe-based alloy fragments shredded for improving flexibility and reducing eddy currents; and a dielectric, filled in at least a portion of gaps formed between some adjacent Fe-based alloy fragments, for reducing an eddy current, wherein the magnetic field shielding layer prevents interference with the transmission and reception of radiators due to a conductor surrounding the radiators and improves characteristics of the radiators, wherein a number of the Fe-based alloy fragments of which diameters are less than 500 μm accounts for 40% or more of a total number of the Fe-based alloy fragments in the magnetic field shielding layer, wherein a number of the Fe-based alloy fragments of which diameters are less than 50 μm accounts for 50% or less of the total number of the Fe-based alloy fragments in the magnetic field shielding layer, wherein the magnetic shield includes one or more additional magnetic field shielding layers, and a dielectric layer interposed between adjacent magnetic shielding layers to adhere the adjacent magnetic field shielding layers to each other and reduce eddy currents, wherein the dielectric layer is an insulating adhesive layer or a heat radiating adhesive layer.

11. The magnetic shield of claim 10, wherein a second radiator is disposed on one surface of the magnetic shield, a copper plate having a thickness of 3 μm is disposed on the other surface of the magnetic shield, and a bifilar coil including two first radiators is disposed at predetermined distance from the second radiator in parallel, and wherein when a wireless power signal is transmitted by applying an input voltage of 6 v of a driving frequency of 750 kHz to the bifilar coil, a maximum receiving distance at which the second radiator can receive the wireless power signal is 58 mm or more.

12. The magnetic of claim 10, wherein a number of the Fe-based alloy fragments of which diameters are less than 5000 μm accounts for 60% or more of the total number of the Fe-based alloy fragments.

13. An electronic device, comprising:
a conductor;
a radiator for a wireless power transmission and disposed adjacent to the conductor; and
a magnetic shield, disposed on a surface of the radiator, comprising a magnetic field shielding layer including Fe-based alloy fragments shredded for improving flexibility and reducing eddy currents; and a dielectric, filled in at least a portion of gaps formed between some adjacent Fe-based alloy fragments, for reducing an eddy current, wherein the magnetic field shielding layer prevents interference with the transmission and reception of radiators due to a conductor and improves characteristics of the radiators,
wherein a number of the Fe-based alloy fragments of which diameters are less than 500 μm accounts for 40% or more of a total number of the Fe-based alloy fragments in the magnetic shielding layers,
wherein the magnetic shield includes one or more additional magnetic field shielding layers, and a dielectric layer interposed between adjacent magnetic shielding layers to adhere the adjacent magnetic field shielding layers to each other and reduce eddy currents,
wherein the dielectric layer is an insulating adhesive layer or a heat-radiating adhesive layer.

* * * * *